(12) United States Patent
Hegde et al.

(10) Patent No.: US 11,743,253 B2
(45) Date of Patent: Aug. 29, 2023

(54) METHODS AND SYSTEMS FOR BIDIRECTIONAL DEVICE AUTHENTICATION

(71) Applicant: Roche Diabetes Care, Inc., Indianapolis, IN (US)

(72) Inventors: Nagaraj Hegde, Indianapolis, IN (US); Craig L. Carlson, Fishers, IN (US); Phillip E. Pash, Indianapolis, IN (US); Robert P. Sabo, Indianapolis, IN (US)

(73) Assignee: Roche Diabetes Care, Inc., Indianapolis, IN (US)

( * ) Notice: Subject to any disclaimer, the term of this patent is extended or adjusted under 35 U.S.C. 154(b) by 1173 days.

(21) Appl. No.: 15/973,692

(22) Filed: May 8, 2018

(65) Prior Publication Data

US 2019/0349368 A1 Nov. 14, 2019

(51) Int. Cl.
*H04L 9/40* (2022.01)
*G06F 16/25* (2019.01)
*G06F 16/22* (2019.01)

(52) U.S. Cl.
CPC ...... *H04L 63/0876* (2013.01); *G06F 16/2282* (2019.01); *G06F 16/258* (2019.01)

(58) Field of Classification Search
CPC .................................................. H04L 63/0876
See application file for complete search history.

(56) References Cited

U.S. PATENT DOCUMENTS

| 7,568,224 | B1 * | 7/2009 | Jennings | H04L 63/126 713/161 |
| 10,524,110 | B1 * | 12/2019 | Klem | H04L 63/18 |
| 2006/0129629 | A1 * | 6/2006 | Kawashima | H04L 61/301 709/203 |
| 2010/0211787 | A1 * | 8/2010 | Bukshpun | H04L 9/14 380/255 |
| 2012/0250863 | A1 * | 10/2012 | Bukshpun | H04L 9/065 380/278 |
| 2014/0030978 | A1 * | 1/2014 | Kim | H04W 76/11 455/39 |
| 2015/0195088 | A1 * | 7/2015 | Rostami | H04L 9/3278 380/28 |
| 2016/0105530 | A1 | 4/2016 | Shribman et al. | |
| 2017/0070941 | A1 | 3/2017 | Veillette | |
| 2019/0207758 | A1 * | 7/2019 | Cambou | H04L 9/0866 |
| 2019/0349368 | A1 * | 11/2019 | Hegde | H04L 9/3273 |

* cited by examiner

*Primary Examiner* — Harris C Wang (74) *Attorney, Agent, or Firm* — Stinson LLP (57) ABSTRACT

A system for bidirectional device authentication between two computing devices is disclosed. A first processor generates a first random number sequence, performs a first operation on the first random number sequence to determine a first table address, and retrieves a first entry in the first table based on the first table address. The processor also executes a first transformation function on the first entry to generate a first transformed entry, transmits the first random number sequence to the second computing device, receives an encoded entry from a second computing device in response to transmission of the first random number sequence, and decodes the encoded entry to determine a second transformed entry. The first transformed entry matches the second transformed entry, and the first processor performs an update to a dynamic table by replacing each entry of the dynamic table with an associated transformed entry.

20 Claims, 5 Drawing Sheets

METHODS AND SYSTEMS FOR BIDIRECTIONAL DEVICE AUTHENTICATION

TECHNICAL FIELD

The present invention relates generally to an apparatus, systems, and methods for providing efficient bidirectional device authentication between networked computing devices.

BACKGROUND

As ad-hoc interaction between computing devices becomes more and more routine, efficient security models for device authentication are increasingly critical. Without an effective method for devices to authenticate one another prior to engaging in communication, such computing devices may be exposed to security exploits and attacks. One model of attack that poses particular concern is a "man-in-the-middle" attack, wherein a rogue device acts as an imposter to deceive another computing device. In this scenario, the rogue device then accesses a communication channel to the targeted computing device. The rogue device may attack the targeted computing device by harvesting information, loading malicious code, or employing similar techniques.

Known services for authenticating computing devices suffer from efficiency problems. For example, known methods of device authentication in BLUETOOTH® protocols may take between four and ten seconds to complete. Further, known authentication services employ complex security key generation which makes bidirectional authentication difficult or impossible to accomplish in a timely manner. As a result, some known systems use only one-way authentication for efficiency. However, this approach leaves at least one of the computing devices exposed to security holes such as man-in-the-middle intrusion.

Thus, particularly in wireless communications, the problem of efficient bidirectional authentication persists.

SUMMARY OF THE DISCLOSURE

It is the object of this disclosure to allow for efficient bidirectional device authentication between networked computing devices.

In one aspect, a system for bidirectional device authentication is provided. The system includes a first computing device having a first processor and a first memory. The first memory is configured to include a first table. The system also includes a second computing device having a second processor and a second memory. The second memory is configured to include a second table. The second computing device is in communication with the first computing device. The first processor is configured to a) generate a first random number sequence, b) perform a first operation on the first random number sequence to determine a first table address, and c) retrieve a first entry in the first table based on the first table address. The processor is also configured to d) execute a first transformation function on the first entry to generate a first transformed entry, e) transmit the first random number sequence to the second computing device, f) receive an encoded entry from the second computing device in response to transmission of the first random number sequence, and g) decode the encoded entry to determine a second transformed entry. The first processor is configured to h) perform an update to a dynamic table, upon verifying that the first transformed entry matches the second transformed entry, by replacing each entry of the dynamic table with an associated transformed entry.

In another aspect, a method for bidirectional device authentication is provided. The method is implemented by a first processor included within a first computing device and the first computing device includes the first processor and a first memory. The first memory is configured to include a first table. The first computing device is in communication with a second computing device having a second processor and a second memory. The second memory is configured to include a second table. The method includes a) generating a first random number sequence, b) performing a first operation on the first random number sequence to determine a first table address, c) retrieving a first entry in the first table based on the first table address, d) executing a first transformation function on the first entry to generate a first transformed entry, and e) transmitting the first random number sequence to the second computing device. The method also includes f) receiving an encoded entry from the second computing device in response to transmission of the first random number sequence, and g) decoding the encoded entry to determine a second transformed entry. The method also includes h) verifying that the first transformed entry matches the second transformed entry, and upon such verification performing an update to a dynamic table by replacing each entry of the dynamic table with an associated transformed entry.

In yet another aspect, a computing device configured for bidirectional device authentication is provided. The computing device includes a first processor and a first memory and the first memory is configured to include a first table. The first computing device is in communication with a second computing device having a second processor and a second memory. The second memory is configured to include a second table. The first processor is configured to a) generate a first random number sequence, b) perform a first operation on the first random number sequence to determine a first table address, c) retrieve a first entry in the first table based on the first table address, and d) execute a first transformation function on the first entry to generate a first transformed entry. The first processor is also configured to e) transmit the first random number sequence to the second computing device, f) receive an encoded entry from the second computing device in response to transmission of the first random number sequence, and g) decode the encoded entry to determine a second transformed entry. The first processor is configured to h) perform an update to a dynamic table, upon verifying that the first transformed entry matches the second transformed entry, by replacing each entry of the dynamic table with an associated transformed entry.

DETAILED DESCRIPTION

Described herein are methods, a system and a device for efficient bidirectional device authentication of computing devices. Specifically, the methods, system, and device apply a dynamic authentication model that provides enhanced device security in an efficient manner. The authentication model described is dynamic in part because it relies upon a random number sequence which is regenerated each time the computing devices connect. Because the authentication is dynamic, greater security is enabled despite the efficient and speedy approach to authentication. Further, as the authentication model is efficient and dynamic, it may easily be applied for bidirectional authentication to mitigate the risk.

In general, as described herein, a first computing device (Device A) may seek to communicate with a second computing device (Device B). Prior to communication, Device A and Device B will engage in the bidirectional authentication model described. In the example embodiment, Device A and Device B are both BLUETOOTH® enabled devices. In this example embodiment, Devices A and B seek to communicate with one another using BLUETOOTH® communication protocols upon authentication. In a second example, Device A and Device B seek to communicate using other wireless protocols including, for example, a wireless protocol as set forth in one of the IEEE 802.11 standards. In a third example, Device A and Device B may seek to communicate using wired network communication protocols such as Ethernet. In a fourth example, Device A and Device B may functionally be enclosed in the same parent device as physical or virtual nodes that utilize authentication for node-to-node communications. In all examples, the bidirectional authentication model may be employed prior to device-to-device communication.

In general, in the absence of the bidirectional authentication method described herein, bidirectional authentication between Device A and Device B may take between four and ten seconds using BLUETOOTH® protocols. Other bidirectional authentication services on other protocols are similarly expensive. Because of the length of such bidirectional authentication, many systems use only unidirectional authentication which may expose the devices to security vulnerabilities. For example, if Device A authenticates Device B, but not vice versa, Device B may be targeted by a man-in-the-middle attack. By contrast, the disclosed methods, system, and device can complete a bidirectional authentication between Device A and Device B at radically reduced speeds of between fifty and sixty (50 and 60) milliseconds on BLUETOOTH® protocols.

In the example embodiment, Device A and Device B are each configured to contain a static table of a length n in their respective memory devices. In the example embodiment, the static table for Device A is pre-programmed into Device A's memory. In the example embodiment, Device A's static table is invariant over time. In some examples, the static table may be reprogrammed based on, for example, a firmware update, a hardware update, or a software update. In other embodiments, Device A may receive updates for the static table from another computing device or a cloud service. In the example embodiment, Device B obtains the entries for its static table from a cloud service, another computing device, or otherwise indirectly from Device A. As such, the static table for Device B matches the static table for Device A. Therefore, the static tables for Device A and Device B have the same respective dimensions with a length n and a row width o.

Device A and Device B also each have a dynamic table. Because the dynamic table is ultimately derived using the static tables, each dynamic table also has a length of n. Prior to authenticating with any other device (whether between Device A and Device B, between Device B and a third device, or between Device A and a third device), the dynamic tables are unpopulated. Subsequently, as set forth herein, the dynamic tables are continually updated each time that the devices attempt to connect to one another or to another computing device.

Device A generates a random number sequence of length m. Length m is sufficient to allow the random number sequence to contain a substring of length l. Length l is sufficient to provide an address for the static table. (As explained below, the substring may also provide an address for the dynamic table, which has the same length, n, as the static table.) For example, if the static table has a length of n=1024 and the substring is a binary number, the substring length l must be at least ten (10) because a binary number that is ten characters long has $2^{10}=1024$ combinations. Therefore, m must also be at least ten (10). In the example embodiment, m is greater than ten (10) to at least accommodate (a) a separate predefined index bit field, (b) the substring, (c) bit fields that define a transformation function that transforms data retrieved from the table, and (d) bit fields that define a decoding function that transforms data subsequently received from another device, such as Device B. In practice, multiple permutations may be made of the random number sequence such that these accommodations overlap or are distinct. Thus, the random number sequence need not have a length requirement other than that it must exceed the substring length l. However, the random number sequence may also be required to be long enough to provide identifications for transformation parameters to transform and decode information.

In the example embodiment, as elaborated herein, the random number sequence is used for a variety of purposes to assist the bidirectional authentication methods described herein. First, the random number sequence includes a means for identifying a substring, such as a predefined index bit field within the random number sequence. Second, the random number sequence also includes the substring itself, which is used to identify a retrieved entry from a pre-defined static table or a dynamic table. Third, the random number sequence further includes a means for defining a transformation function. In the example embodiment, the random number sequence includes bit fields that specify additional entries from the table containing the retrieved entry (whether it is the pre-defined static table or the dynamic table). These additional entries may be combined with the retrieved entry to create a plurality of table entries. The plurality of table entries is processed using a function, typically a bitwise function. The bitwise function creates a transformed entry. Fourth, the random number sequence is used to decode a second transformed entry that is retrieved from the second computing device. As such, the use of the random number sequence ensures that the bidirectional authentication method described herein is significantly characterized by randomness. Because of such reliance on randomness, the methods are resistant to exploits and vulnerabilities caused by devices seeking to mine out information from the computing devices.

Upon generating the random number sequence, Device A is configured to identify the substring from the random number sequence. The substring has a length l sufficient to allow the substring to define an address within the static table. In the example embodiment, the random number sequence is of length m, where m>l. In all scenarios, m≥l.

In the example embodiment, Device A identifies the substring by retrieving a set of predefined index bit fields within random number sequence. The predefined index bit fields have a length k. k must be long enough to address the entire random number sequence. For example, where random number sequence is thirty-two (32) bits long, k is at least five (5) bits long because a five bit string has $2^5=32$ combinations, allowing for addressing the entire random number sequence. The location of the predefined index bit fields within the substring may vary, depending upon the embodiment. For simplicity, in this example, the first five (5) bits (indexed as bit fields 31-27) are used for the predefined index bit fields. Device A determines the decimal value of the predefined index bit fields. As indicated above, the decimal value of the binary bits will range between 0 and 31 to provide an addressing option for every position within the random number sequence. Thus, the decimal value defines a starting position within the random number sequence.

Device A performs a comparison between the derived decimal value of the predefined index bit fields and a predefined set value. This comparison determines the orientation of the substring with respect to the position identified by the derived decimal value. For example, the decimal value may be compared to the predefined value of x and any decimal value exceeding x will cause the substring to be based on the ten (10) bit fields preceding the starting position (or initial address) within the random number sequence. By contrast, any decimal value less than or equal to x will cause the substring to be based on the ten bit fields after the starting position (or initial address) within the random number sequence. However, these examples are exemplary and it shall be understood that any suitable method of identifying a substring may be used.

Once Device A identifies the substring, Device A processes the substring to identify a first table address. Specifically, the substring is converted from binary to a decimal value that corresponds to the row of the first table address. For example, if the substring equals 0101111101, that substring has a decimal value of three-hundred and eighty-one (381) and which Device A identifies as the first table address. Using the first table address, Device A retrieves the associated table entry.

Device A selects which table to use (i.e. the pre-defined static table or the dynamic table) based on determining the history of communication between Device A and Device B. In the example embodiment, Device A retrieves local connection information to determine if it has previously connected to Device B. If Device A determines that Device A and Device B have previously communicated without interruption from another communicating device, Device A retrieves the associated table entry from the dynamic table. However, if Device A determines that Device A and Device B have never previously communicated, Device A retrieves the associated table entry from the pre-defined static table. Further, if Device A or Device B have previously communicated, but Device A determines that one of the devices (Device A or Device B) subsequently communicated with another device (e.g., third device, Device C), Device A retrieves the associated table entry from the pre-defined static table. Thus, generally the dynamic table is used when Device A and Device B are re-connecting without interruption from another device. By contrast, the pre-defined static table is used when either (a) Device A and Device B are connecting for the first time or (b) Device A and Device B have previously connected, but another device (e.g., Device C) connected with one of the devices subsequently.

Based on the foregoing, Device A retrieves the table entry from the appropriate table. Device A converts the retrieved table entry to a transformed entry using a first transformation function. In general, the first transformation function is a bitwise function (or another simple function) processes multiple table entries (including the retrieved table entry) and create a new transformed entry. In the example embodiment, the bitwise function is an XOR function. In other embodiments, it could be any other bitwise function or other equivalently simple function.

In the example embodiment, the random number sequence also contains a transformation substring that identifies a number of transformation entries that will be used to define the plurality of table entries which then aid in transforming the retrieved table entry. In the example embodiment, the last four bits of the random number sequence are used for the transformation substring. Thus, in this example, a maximum of $2^4=16$ entries may be retrieved from the table to define the plurality of table entries. In other embodiments, a longer or shorter transformation substring may be used with relatively minimal implication to the efficiency of the method. After identifying the transformation substring, Device A determines a decimal value associated with the transformation substring which specifies how many table entries are input into the transformation function. If the decimal value is odd, an equal number of table entries are retrieved above and below the retrieved table entry. (For example, if the decimal value is seven, three entries above the retrieved entry and three entries below the retrieved entry are used with the retrieved entry to create the plurality of table entries. Thus a total of seven table entries are identified for processing by the bitwise function.) If the decimal value is even, the greater number of entries is retrieved from above the retrieved entry. (For example, if the decimal value is six, three entries above the retrieved entry and two entries below the retrieved entry are used with the retrieved entry to create the plurality of table entries. Thus a total of six table entries are identified for processing by the bitwise function.) In other embodiments, if the decimal value is even, the greater number of entries is retrieved from below the retrieved entry. In the event that the decimal value is zero or one, Device A will nevertheless retrieve one entry above and one entry below the retrieved entry. In some examples, if the retrieved table entry is near the top or bottom of the table, the transformation substring may specify that the plurality of table entries includes "out of bounds" entries. In such cases, Device A may seek those portions of the plurality of table entries by "looping back" to the bottom or top of the table.

Device A processes the plurality of table entries with the transformation function and determines a value R1.

Device A also transmits the first random number sequence to Device B. Device A may accomplish such transmission using any suitable method associated with the protocols used between Devices A and B. Device B receives the first random number sequence and retrieves an associated table entry from a table. As was the case with Device A, Device B will retrieve the associated table entry from the static table is used when either (a) Device A and Device B are connecting for the first time or (b) Device A and Device B have previously connected, but another device (e.g., Device C) connected with one of the devices subsequently. Device B retrieves the associated table entry from the dynamic table when Device A and Device B are re-connecting without interruption from another device. As with Device A, Device B is configured to identify the substring from the random number sequence. In the example embodiment, the random number sequence and its substring, predefined index bit fields, and transformation substring are structured identically for Device A and Device B. In other examples, the random number sequence and its associated components are configured differently.

In the example embodiment, Device B identifies the substring by retrieving the set of predefined index bit fields within random number sequence. As with Device A, Device B performs a comparison between the derived decimal value of the predefined index bit fields and a predefined set value and identifies the substring.

Once Device B identifies the substring, Device B processes the substring to identify a first table address in a manner similar to that performed by Device A. Using the first table address, Device B retrieves the associated table entry.

Device B selects which table to use (i.e. the pre-defined static table or the dynamic table) based on determining the history of communication between Device A and Device B.

Based on the foregoing, Device B retrieves the table entry from the appropriate table. Device B converts the retrieved table entry to a transformed entry using a transformation function. As with Device A, the transformation function is a bitwise function (or another simple function) processes multiple table entries (including the retrieved table entry) and create a new transformed entry. In the example embodiment, the bitwise function is an XOR function. In other embodiments, it could be any other bitwise function or other equivalently simple function.

Device B identifies the transformation substring and determines a decimal value associated with the transformation substring which specifies how many table entries are input into the transformation function. Device B processes the plurality of table entries with the transformation function and determines a value R2. As Device B is configured to apply the same, or substantially similar, transformation functions as Device A, it is understood that R2=R1 unless (a) an intruding device is present, (b) Device A or Device B inadvertently retrieved table entries from the wrong table, or (c) Device A or Device B is misconfigured.

Device B is also configured to perform a further encoding function on R2. In the example embodiment, Device B uses a reversible bitwise function such as XOR to process the inputs of the random number sequence and R2 and produce R3. In other embodiments, other reversible functions and bitwise functions may be used.

Device B is configured to transmit R3 back to Device A. Device A applies a decoding function to R3 and the random number sequence. Device A retains the random number sequence in memory during the authentication procedure. Device A thus obtains R2. Device A compares R2 to R1. If Device A successfully determines that R2 and R1 are identical, authentication is confirmed.

Device B then generates its own random number sequence and repeats the same process, from its perspective. If Device B likewise successfully compares R2 and R1, bidirectional authentication is confirmed.

Upon successfully determining that bidirectional authentication has occurred, Device A and B update their respective dynamic tables. Each device applies a tabular transformation function on each entry of: (a) the pre-defined static table if the devices have never communicated before or were interrupted by a third communicating device, or (b) the dynamic table if the devices previously communicated without interruption. Substantively, the tabular transformation function is a bitwise function or an equivalently simple function that processes each tabular entry along with the random number sequence. Thus, as the random number sequence constantly regenerates with each reconnection, the dynamic tables of Device A and Device B similarly are regenerated with each connection.

In some examples, the bidirectional authentication fails because one or both of Devices A and B determine that R1≠R2. In such cases, the devices are configured to appropriately respond. In a first example, Device A determines that it has not previously connected with Device B but Device A determines that R1≠R2. In such examples, Device A and Device B should be configured to utilize a matching pre-defined static table and a matching random number sequence. In the example embodiment, Device A attempts at least one retry of the authentication process. If Device A determines that R1≠R2 after the retry attempt(s), Device A denies future attempts to connect with Device B. In some examples, Device A enters a time-out period and refuses further connection requests. In such examples, Device A may transmit an alert indicating a configuration error.

In a second example, Device A determines that it has previously connected with Device B and no other device has subsequently connected to either device. In this example, both devices should be configured to utilize a dynamic table (rather than the pre-defined static table) for connections. If Device A determines that R1≠R2, Device A allows limited reconnection attempts (e.g., one or two attempts). If the reconnection attempts fail, Device A enters a time-out period and refuses further connection requests. In such examples, Device A may transmit an alert indicating a configuration error. In further examples, Device A and Device B may attempt reconnection using the pre-defined static table as the devices may determine that the dynamic tables are unreliable.

In a third example, Device A determines that it has previously connected with Device B, but also determines that another device subsequently connected with at least one of Device A and Device B. In such examples, Device A and Device B are configured to utilize a matching pre-defined static table and a matching random number sequence. In the example embodiment, Device A attempts at least one retry of the authentication process. If Device A determines that R1≠R2 after the retry attempt(s), Device A denies future attempts to connect with Device B. In some examples, Device A enters a time-out period and refuses further connection requests. In such examples, Device A may transmit an alert indicating a configuration error.

As indicated above, the described bidirectional authentication method may be conducted at reduced speeds compared to known bidirectional authentication methods. When applied using BLUETOOTH® protocols, the method may take approximately fifty (50) milliseconds.

In some examples, Device A may break an authenticated communication with Device B to communicate with a third device (e.g., Device C). In such cases, Device A may be configured to alert Device B of the changed status. When Device A and Device B reconnect, Device A and Device B use the pre-defined static table for bidirectional authentication, rather than the dynamic table. Similarly, Device B may break authenticated communication with Device A to communicate with a third device (e.g., Device C). In such cases, Device B may be configured to alert Device A of the changed status. When Device A and Device B reconnect, Device A and Device B use the pre-defined static table for bidirectional authentication, rather than the dynamic table.

The systems, methods, and apparatus described may also be configured to resist "brute force" attacks to improperly connect. For example, the devices may be configured to limit connection retries when an authenticating device determines that R1≠R2. In one example, the devices are configured to allow only one retry if the devices use the pre-defined static tables for authentication. In another example, the devices are configured to allow only two retries if the devices use the dynamic tables for authentication.

In another example, a rogue device may attempt to reconnect using a changing address. Thus, Device A may see multiple connection attempts from what appear to be multiple devices (e.g., "Device D", "Device E", and "Device F") when only one rogue device is making such attempts. If Device A sees more than one device (as indicated by changing addresses) attempt to authenticate, but determines that R1≠R2, Device A may be configured to go into "time-out" mode and send an alert of an intrusion attempt.

In the example embodiment, the static table is not resident in user-accessible memory. Rather, the static table, however provided is stored in a manner that cannot be directly accessed. In one example, certain devices (e.g., mobile devices) access the static table via a cloud service and purge the static table when an associated application is removed from memory.

As noted above, the systems, methods, and devices disclosed allow for the static tables to be updated by firmware, hardware, and software updates as well as updates to cloud services.

A technical effect of the systems and methods described herein is achieved by performing at least one of the following steps: (a) generating a first random number sequence, (b) performing a first operation on the first random number sequence to determine a first table address, (c) retrieving a first entry in the first table based on the first table address, (d) executing a first transformation function on the first entry to generate a first transformed entry, (e) transmitting the first random number sequence to the second computing device, (f) receiving an encoded entry from the second computing device in response to transmission of the first random number sequence, (g) decoding the encoded entry to determine a second transformed entry, (h) upon verifying that the first transformed entry matches the second transformed entry, performing an update to a dynamic table by replacing each entry of the dynamic table with an associated transformed entry, (i) identifying a substring of the first random number sequence, wherein the substring has a length sufficient to allow the substring to define the first table address, (j) processing the substring to identify the first table address, (k) determining that the first computing device has not previously communicated with the second computing device, and retrieving the first entry in the first table comprising a pre-defined static table, based on the first table address, (l) determining that the first computing device has previously communicated with the second computing device, and retrieving the first entry in the first table comprising a pre-defined static table, based on the first table address, (m) decoding the encoded entry by applying a decoding transformation function to the encoded entry and the first random number sequence, to determine the second transformed entry, (n) retrieving a transformation substring from the first random number sequence, (o) identifying a plurality of transformation entries from the first table based on the transformation substring, (p) retrieving the plurality of transformation entries, (q) executing the first transformation function on the plurality of transformation entries to generate the first transformed entry, (r) retrieving the each entry of the first table, (s) defining a second transformation function using the first random number sequence, (t) transforming the each entry of the first table with the second transformation function to obtain the associated transformed entry, and (u) performing the update to the dynamic table by replacing the each entry of the dynamic table with the associated transformed entry.

As used herein, the term processor refers to central processing units, microprocessors, microcontrollers, reduced instruction set circuits (RISC), application specific integrated circuits (ASIC), logic circuits, and any other circuit or processor capable of executing the functions described herein.

Disclosed herein is a method that may include receiving random number sequences and manipulating tables based on such random number sequences. Such variations of the tabular data and retrieved table entries may be stored in any format on any storage device in or in communication with the computing devices described herein. The computing devices can convert the table entries to a format suitable for storage in reserved memory of a communication device. The reserved memory may exist in the form of the pre-defined element of the device's Electrically-Erasable Programmable Read-Only Memory (EEPROM). The reserved memory resides on the computing devices and is intended and reserved to store device address information.

Before describing in detail embodiments that are in accordance with the present disclosure, it should be observed that the embodiments reside primarily in combinations of method steps, system elements, and device components related to bidirectional authentication of computing devices. Accordingly, the device components, system elements, and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relative relational terms such as first and second, top and bottom, and the like may be used solely to distinguish one entity or action from another entity or action without necessarily requiring or implying any actual such relationship or order between such entities or actions.

The terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device. An element proceeded by "comprises . . . a" does not, without more constraints, preclude the existence of additional identical elements in the process, method, article, or device that comprises the element.

It will be appreciated that embodiments of the disclosure described herein may be comprised of one or more conventional processors and unique stored program instructions that control the one or more processors to implement, in conjunction with certain non-processor circuits, some, most, or all of the functions of preparing a communications device for the bidirectional authentication methods described herein. The non-processor circuits may include, but are not limited to, a radio receiver, a radio transmitter, signal drivers, clock circuits, power source circuits, and user input devices. As such, these functions may be interpreted as steps of a method to perform preparing a computing device for bidirectional authentication with another computing device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
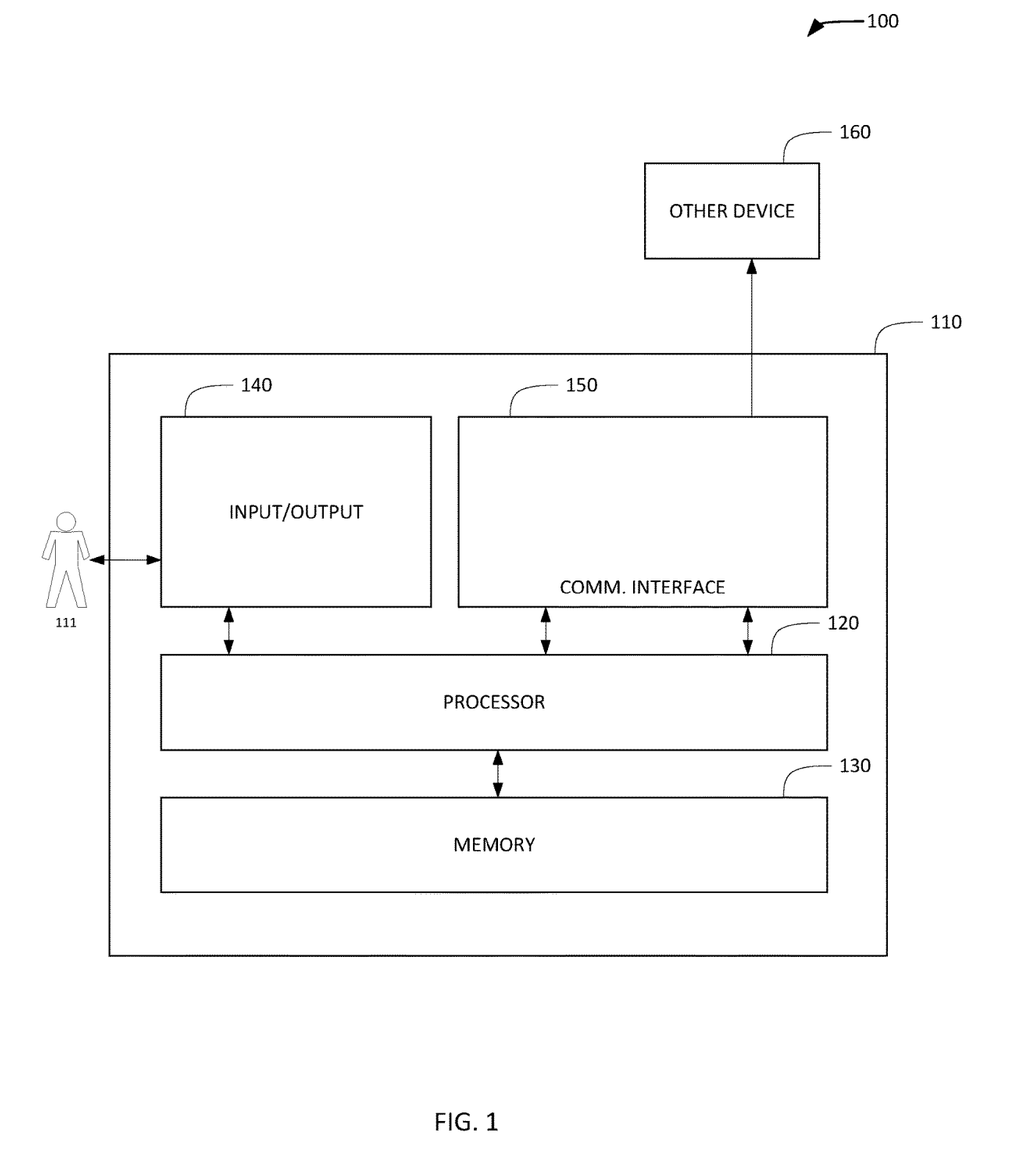
FIG. 1 illustrates an exemplary configuration of a pair of computing device, as described herein.

FIG. 1 illustrates an exemplary configuration 100 of a computing device such as Device A or Device B. Specifically, FIG. 1 illustrates an exemplary configuration 100 of a computing device 110 operated by a user 111 in accordance with one embodiment of the present invention. Computing device 110 may include, but is not limited to, biomedical sensor computing devices, mobile computing devices, stationary computing devices, computing peripheral devices, smart phones, wearable computing devices, medical computing devices, and vehicular computing devices. Alternatively, computing device 110 may be any computing device capable of the bidirectional authentication methods described herein. In some variations, the characteristics of the described components may be more or less advanced, primitive, or non-functional.

In the exemplary embodiment, computing device 110 includes a processor 120 for executing instructions. In some embodiments, executable instructions are stored in a memory area 130. Processor 120 may include one or more processing units, for example, a multi-core configuration. Memory area 130 is any device allowing information such as executable instructions and/or written works to be stored and retrieved. Memory area 130 may include one or more computer readable media.

Computing device 110 also includes at least one input/output component 140 for receiving information from and providing information to user 111. In some examples, input/output component 140 may be of limited functionality or non-functional as in the case of some wearable computing devices. In other examples, input/output component 140 is any component capable of conveying information to or receiving information from user 111. In some embodiments, input/output component 140 includes an output adapter such as a video adapter and/or an audio adapter. Input/output component 140 may alternatively include an output device such as a display device, a liquid crystal display (LCD), organic light emitting diode (OLED) display, or "electronic ink" display, or an audio output device, a speaker or headphones. Input/output component 140 may also include any devices, modules, or structures for receiving input from user 111. Input/output component 140 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 140. Input/output component 140 may further include multiple sub-components for carrying out input and output functions.

Computing device 110 may also include a communications interface 150, which may be communicatively coupleable to a remote device such as a remote computing device, a remote server, or any other suitable system. Communication interface 150 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 150 is configured to allow computing device 110 to interface with any other computing device using an appropriate wireless or wired communications protocol such as, without limitation, BLUETOOTH®, Ethernet, or IEE 802.11. Communications interface 150 allows computing device 110 to communicate with any other computing devices 160.

Figure 2:
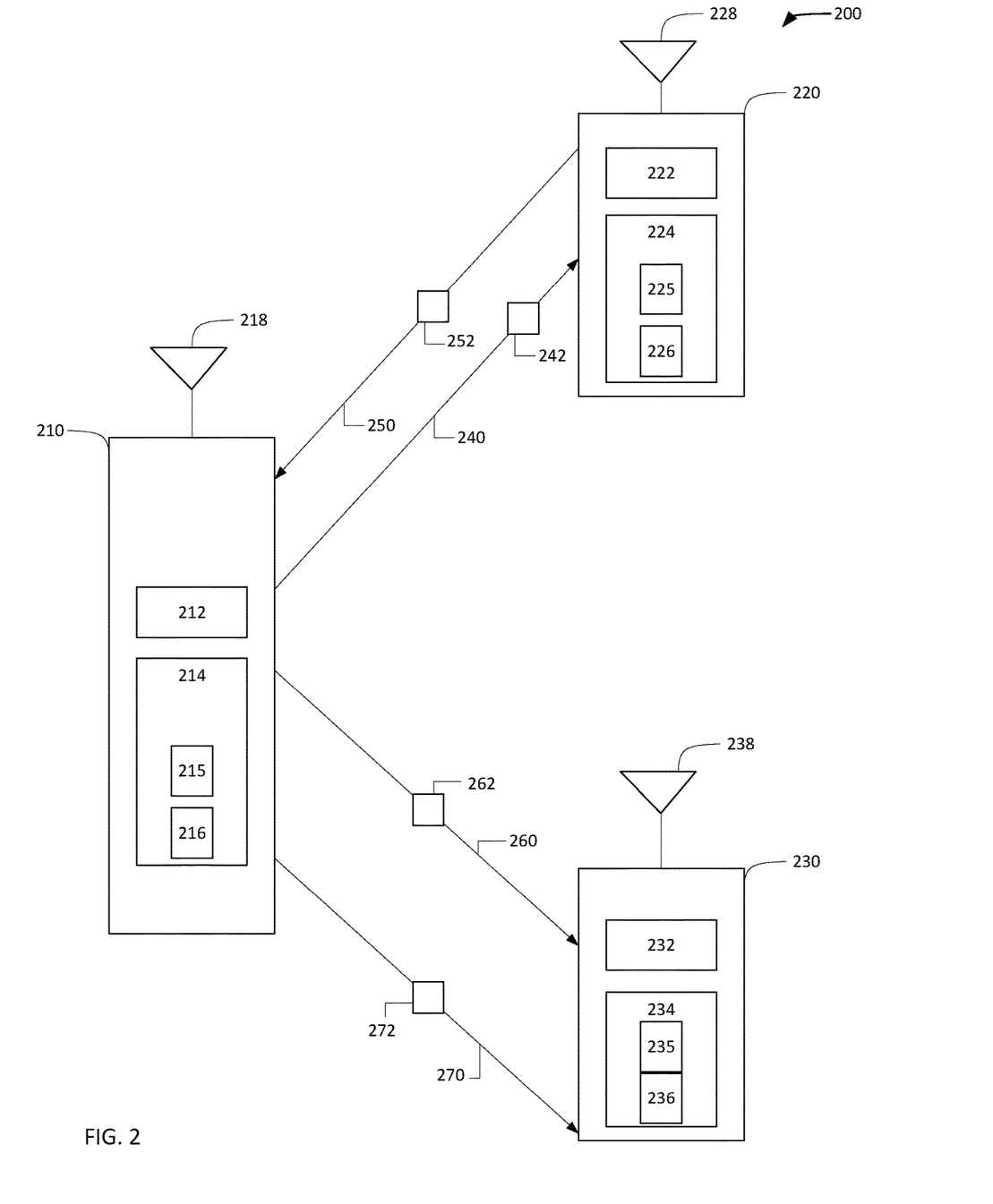
FIG. 2 illustrates exemplary authentication mechanisms, components, and interfaces for authenticating the computing devices of FIG. 1.

FIG. 2 illustrates exemplary authentication mechanisms, components, and interfaces for authenticating computing devices such as the computing device 110 shown in FIG. 1. Specifically, FIG. 2 illustrates an exemplary communication system 200 between computing devices 210, 220, and 230. As described herein, each of computing devices 210, 220, and 230 may be described by computing device 110. Accordingly, each computing device 210, 220, and 230 has an associated processor 212, 222, and 232 respectively, an associated memory 214, 224, and 234 respectively, and a communications interface 218, 228, 238 respectively. As described above and herein, the respective memory devices 214, 224, and 234 each include a pre-defined static table 215, 225, and 235 and a dynamic table 216, 226, and 236.

As described above and herein, the bidirectional authentication process employs a new authentication mechanism that is applied before the computing devices (e.g., computing device 210 and 220) connect and communicate. In system 200, in order to complete bidirectional authentication between computing device 210 and computing devices 220, computing device 210 generates a first random number sequence.

Computing device 210 performs a first operation on the first random number sequence to determine a first table address. As described above, depending upon the prior connectivity information computing device 210 identifies a table entry from pre-defined static table 215 or dynamic table 216. Specifically, computing device 210 identifies a substring of the first random number sequence, wherein the substring has a length sufficient to allow the substring to define the table address. Computing device 210 also processes the substring to identify the first table address. Computing device 210 determines whether to retrieve a table entry from the pre-defined static table 215 or the dynamic table 216 by determining if computing device 210 has previously communicated with second computing device 220. If computing device 210 has previously communicated with computing device 220 without interruption, computing device 210 retrieves the table entry from dynamic table 216. Computing device 210 retrieves the table entry from pre-defined static table 215 if (a) computing devices 210 and 220 are connecting for the first time or (b) computing devices 210 and 220 have previously connected, but another device (e.g., computing device 230) connected with one of the devices subsequently.

Computing device 210 retrieves the table entry from either of pre-defined static table 215 or dynamic table 216 and executes a first transformation function on the retrieved table entry to generate a first transformed entry R1. More specifically, computing device 210 retrieves a transformation substring from the first random number sequence, identifies a plurality of transformation entries from the table based on the transformation substring, retrieves a plurality of transformation entries, and executes the first transformation function on the plurality of transformation entries to generate the first transformed entry, R1. As described above, computing device applies the first transformation function as a bitwise function or an equivalently simple function.

Computing device 210 also transmits the random number sequence as random number sequence packet 242 to computing device 220 along transmission channel 240. Computing device 220 similarly retrieves a table entry from either of pre-defined static table 225 or dynamic table 226 and executes a transformation function on the retrieved table entry to generate a transformed entry R2. Computing device 220 also encodes the transformed entry using a reversible bitwise function and the random number sequence to generate encoded entry R3 and transmits the encoded packet 252 along transmission channel 250. As defined herein, transmission channels 240, 250, 260, and 270 are all transmission channels suitable for the protocol used between the computing devices 210, 220, and 230. (Briefly, if computing device 210 seeks to authenticate with computing device 230, it may use transmission channels 260 and 270 using the methods described herein including transmitting random number sequence 262 and receiving encoded packet 272.)

Computing device 210 receives encoded packet 252 as an encoded entry R3 and performs a bitwise function using R3 and the random number sequence to determine the second transformed entry R2. Computing device 210 compares R1 to R2 and, if the comparison is successful (i.e., R1=R2), computing device 210 performs an update to the dynamic table 216 by replacing each entry of dynamic table 216 with an associated transformed entry. Similarly, computing device 220 performs an equivalent authentication process using the same random number sequence and an associated table. If computing device 210 and 220 each determine that R1=R2, the computing devices each update their respective dynamic tables 216 and 226.

Figure 3:
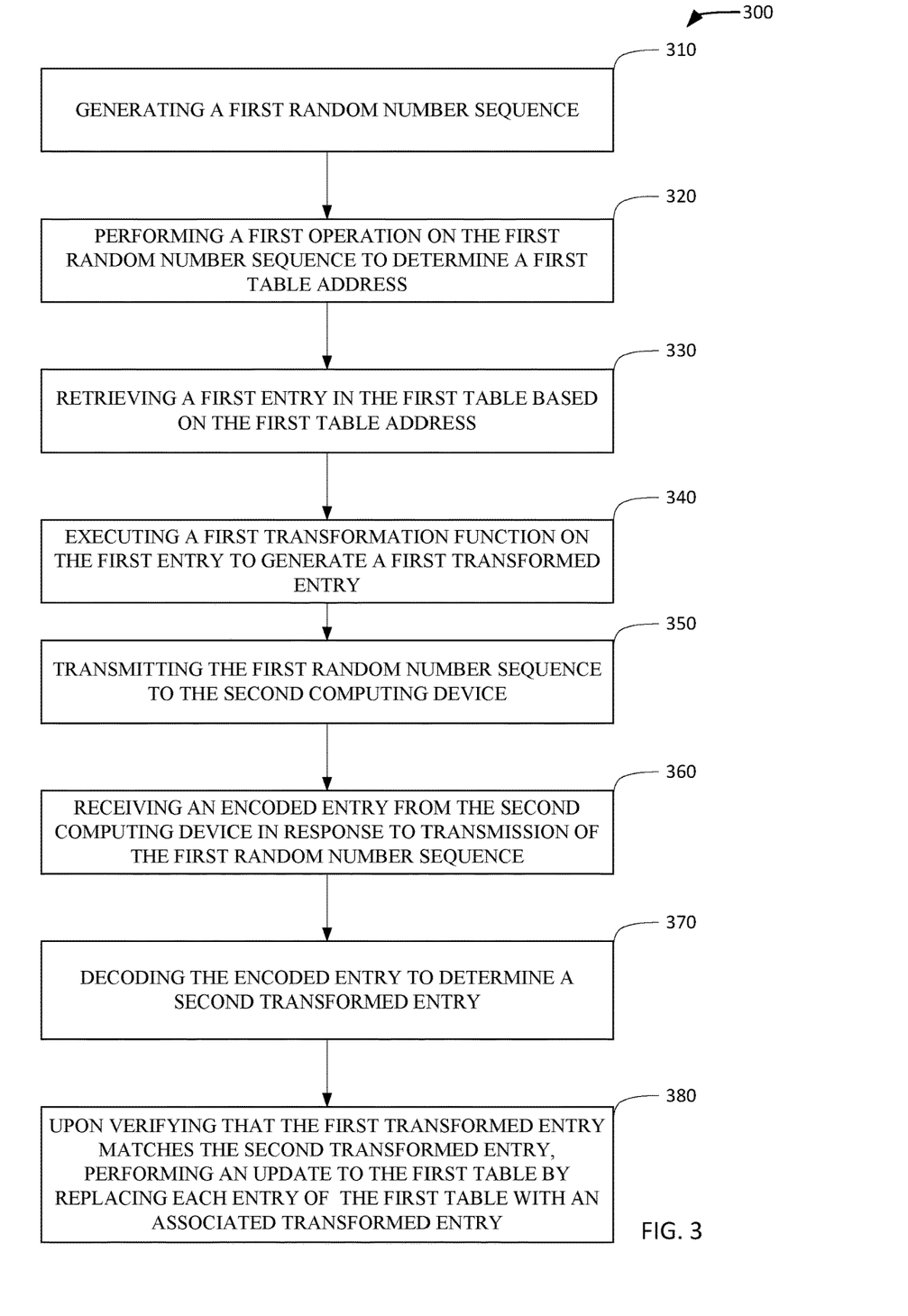
FIG. 3 is a flowchart representing the general method of bidirectional authentication in accordance with one embodiment of the present design.

Referring to FIG. 3, a flowchart 300 representing the general method of bidirectional device authentication in accordance with the present design is shown. In flowchart 300, a computing device (e.g., computing devices 210, 220, or 230 of FIG. 2) generates 310 a first random number sequence. The computing device also performs 320 a first operation on the first random number sequence to determine a first table address and retrieves 330 a first entry in the first table based on the first table address. The computing device also executes 340 a first transformation function on the first entry to generate a first transformed entry and transmits 350 the first random number sequence to a second computing device. For example, computing device 210 may transmit random number sequence packet 242 to computing device 220. Computing device 220 performs similar authentication steps and transmits an encoded packet 252 to computing device 210 which receives 360 the encoded entry from the second computing device in response to transmission of the first random number sequence. Computing device 210 also decodes 370 the encoded entry to determine a second transformed entry. Upon verifying that the first transformed entry matches the second transformed entry, computing device 210 performs an update 380 to the dynamic table by replacing each entry of the first table with an associated transformed entry.

Figure 4:
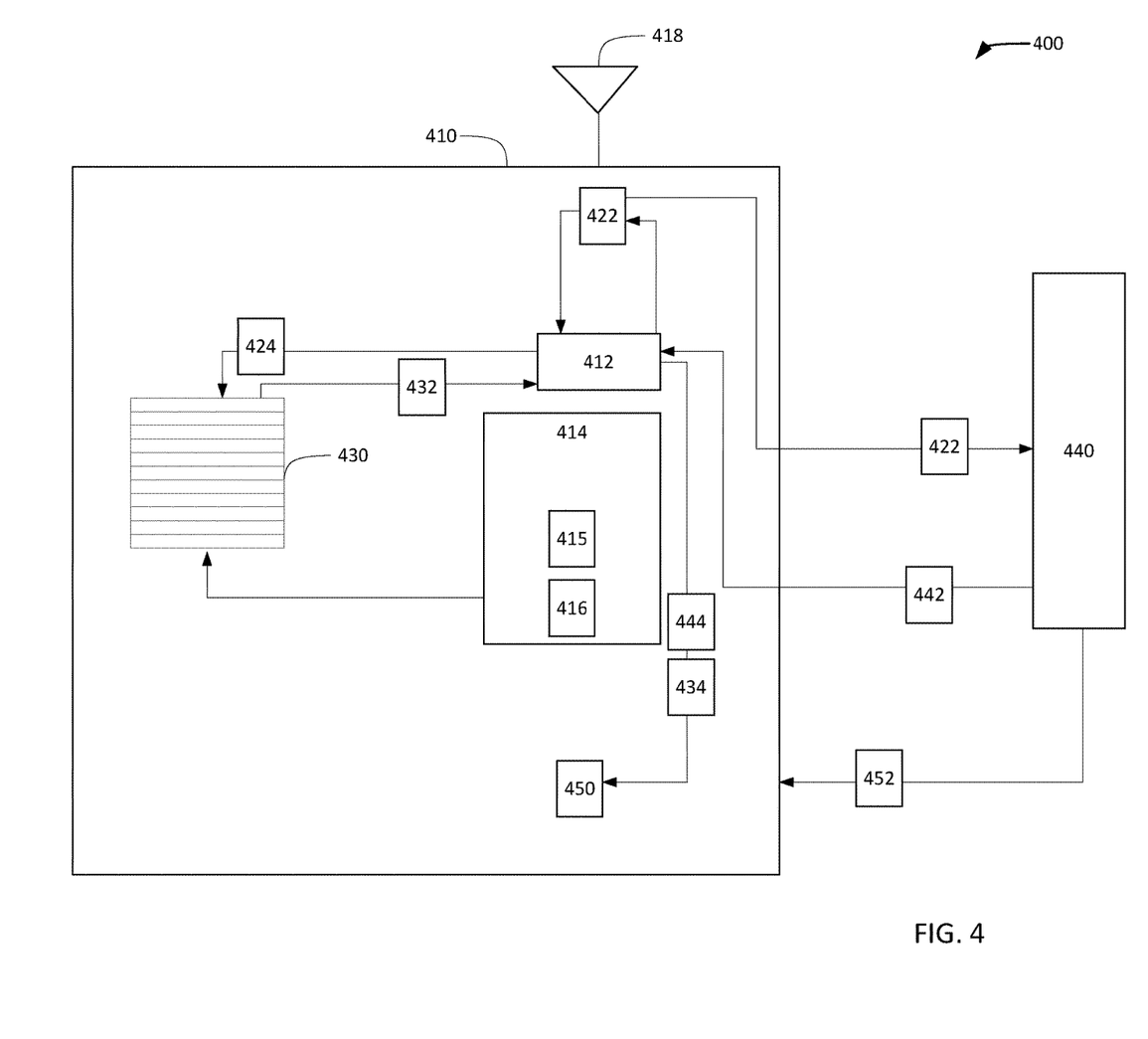
FIG. 4 is a flow diagram representing the authentication process from the perspective of the computing device shown in FIG. 1.

FIG. 4 is a flow diagram 400 representing the authentication process from the perspective of the computing device shown in FIG. 1 and FIG. 2. Specifically, computing device 410 may represent computing device 110, 210, 220, or 230 as shown in FIGS. 1 and 2. In FIG. 4, computing device 410 seeks bidirectional authentication with a second computing device 440. Accordingly, computing device 410 is configured to include processor 412, memory 414, and communications interface 418. Further, memory 414 is configured to include a pre-defined static table 415 that is either pre-programmed or obtained from an external service as defined herein. Memory 414 also includes a dynamic table 416 that unpopulated as a default and continually updated when computing device 410 connects to other devices using the methods described herein. Likewise, computing device 440 is configured equivalently to computing device 410 as reflected in the descriptions herein (not shown).

Computing device 410 generates a first random number sequence 422 using processor 412. Computing device 410 further processes first random number sequence 422 with a first operation to determine a first table address 424 from a first table 430 selected between pre-defined static table 415 and dynamic table 416. As described herein, processor 412 is further configured to determine first table 430 based on information related to the connection history of computing device 410. Specifically, computing device 410 and processor 412 select dynamic table 416 as first table 430 when computing device 410 is re-connecting to second device 440 without interruption from another device. By contrast, computing device 410 and processor 412 select pre-defined static table 415 when either (a) computing device 410 is connecting computing device 440 for the first time or (b) when computing device 410 has previously connected to computing device 440, but another device connected subsequently to computing device 410 or the computing device 440.

Computing device 410 retrieves a first entry 432 from first table 430 based on first table address 424. Computing device 410 executes a transformation function on first entry 432 to generate a first transformed entry 434. Computing device 410 also transmits random number sequence 422 to computing device 440 and receives encoded entry 442. Computing device 410 further decodes encoded entry into a second transformed entry 444 and completes an authentication function 450 to verify that first transformed entry 434 matches second transformed entry 444, or, that R1=R2 as described above. If computing device 410 successfully completes authentication function 450, it verifies that computing device 440 also authenticates a similar authentication function with authentication verification 452. If both computing devices 410 and 440 successfully authenticate that R1=R2, computing device 410 and computing device 440 update their respective dynamic tables as described herein.

Figure 5:
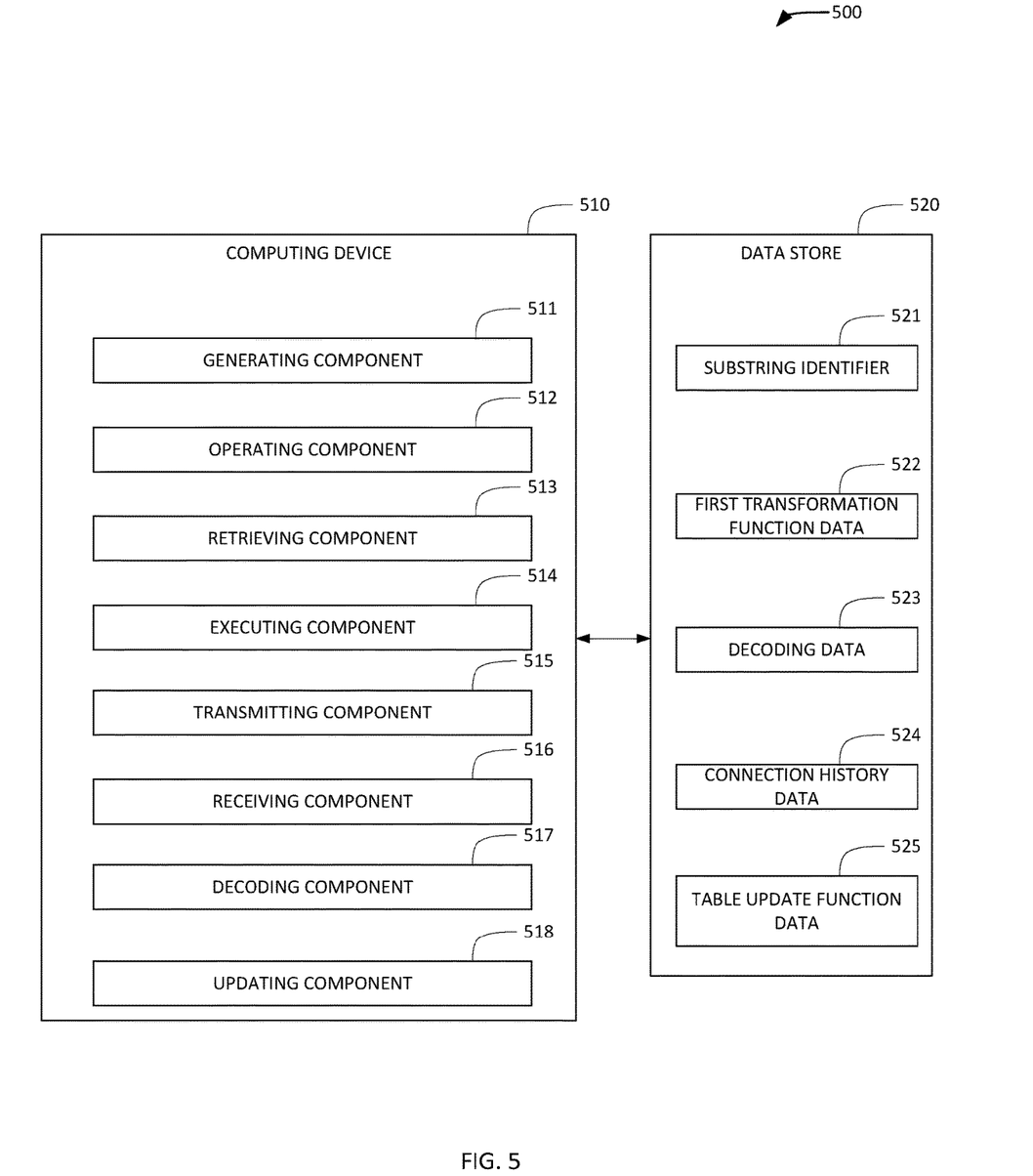
FIG. 5 is a diagram of elements of one or more example computing devices that may be used in the system shown in FIGS. 3 and 4.

FIG. 5 is a diagram 500 of components of one or more example computing devices that may be used in the system 200 shown in FIG. 2. In some embodiments, computing device 510 is similar to computing device 110, 210, 220, 230, 410, or 440, as shown in FIGS. 1, 2, and 4.

Data store 520 may be stored at a memory such as memory 130 (shown in FIG. 1) or any other suitable location. Data store 520 may be coupled with several separate components 511, 512, 513, 514, 515, 516, 517, 518 within computing device 510, which perform specific tasks.

In this embodiment, data store 520 includes substring identifier 521, first transformation function data 522, decoding data 523, connection history data 524, and table update function data 525. Computing device 510 may include data store 520, as well as data storage devices (not shown).

Computing device 510 also includes a generating component 511 for generating a first random number sequence, an operating component 512 for performing a first operation on the first random number sequence to determine a first table address, a retrieving component 513 for retrieving a first entry in the first table based on the first table address, an executing component 514 for executing a first transformation function on the first entry to generate a first transformed entry a transmitting function 515 for transmitting the first random number sequence to the second computing device, a receiving component 516 for receiving an encoded entry from the second computing device in response to transmission of the first random number sequence, a decoding component 517 for decoding the encoded entry to determine a second transformed entry, and an updating component 518 for performing an update to a dynamic table by replacing each entry of the first table with an associated transformed entry upon verifying that the first transformed entry matches the second transformed entry.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

All of the patents, patent applications, patent application publications and other publications recited herein are hereby incorporated by reference as if set forth in their entirety.

The present inventive concept has been described in connection with what are presently considered to be the most practical and preferred embodiments. However, the inventive concept has been presented by way of illustration and is not intended to be limited to the disclosed embodiments. Accordingly, one of skill in the art will realize that the inventive concept is intended to encompass all modifications and alternative arrangements within the spirit and scope of the inventive concept as set forth in the appended claims. Numbered embodiments are presented below.

Numbered Embodiments

In addition or as an alternative to the above, the following embodiments are described:

1. A system for bidirectional device authentication configured to exchange random number sequences between a first computing device and a second computing device, and to use the random number sequences with tables and transformation functions to accomplish bidirectional device authentication, said system comprising:

a first computing device having a first processor and a first memory, said first memory configured to include a first table; and a second computing device having a second processor and a second memory, said second memory configured to include a second table, said second computing device in communication with said first computing device;

wherein said first processor is configured to:

generate a first random number sequence;

perform a first operation on said first random number sequence to determine a first table address;

retrieve a first entry in said first table based on said first table address;

execute a first transformation function on said first entry to generate a first transformed entry;

transmit said first random number sequence to said second computing device;

receive an encoded entry from said second computing device in response to transmission of said first random number sequence;

decode said encoded entry to determine a second transformed entry; and upon verifying that said first transformed entry matches said second transformed entry, perform an update to a dynamic table by replacing each entry of said dynamic table with an associated transformed entry.

2. The system of Embodiment 1, wherein said first processor is further configured to:

identify a substring of said first random number sequence, wherein said substring has a length sufficient to allow said substring to define said first table address; and process said substring to identify said first table address.

3. The system of Embodiment 1, wherein said first processor is further configured to:

determine that said first computing device has not previously communicated with said second computing device; and retrieve said first entry in said first table comprising a pre-defined static table, based on said first table address.

4. The system of Embodiment 1, wherein said first processor is further configured to:

determine that said first computing device has previously communicated with said second computing device; and retrieve said first entry in said first table comprising a dynamic table, based on said first table address.

5. The system of Embodiment 1, wherein said first processor is further configured to:
decode said encoded entry by applying a decoding transformation function to said encoded entry and said first random number sequence, to determine said second transformed entry.

6. The system of Embodiment 1, wherein said first processor is further configured to:
retrieve a transformation substring from said first random number sequence;
identify a plurality of transformation entries from said first table based on said transformation substring;
retrieve said plurality of transformation entries; and
execute said first transformation function on said plurality of transformation entries to generate said first transformed entry.

7. The system of Embodiment 1, wherein said first processor is further configured to:
retrieve said each entry of said first table;
define a second transformation function using said first random number sequence;
transform said each entry of said first table with said second transformation function to obtain said associated transformed entry; and
perform said update to said dynamic table by replacing said each entry of said dynamic table with said associated transformed entry.

8. A method for bidirectional device authentication implemented by a first processor included within a first computing device, said first computing device comprising said first processor and a first memory, said first memory configured to include a first table, said first computing device in communication with a second computing device having a second processor and a second memory, said second memory configured to include a second table, said method comprising:
generating a first random number sequence;
performing a first operation on said first random number sequence to determine a first table address;
retrieving a first entry in said first table based on said first table address;
executing a first transformation function on said first entry to generate a first transformed entry;
transmitting said first random number sequence to said second computing device;
receiving an encoded entry from said second computing device in response to transmission of said first random number sequence;
decoding said encoded entry to determine a second transformed entry; and
upon verifying that said first transformed entry matches said second transformed entry, performing an update to a dynamic table by replacing each entry of said dynamic table with an associated transformed entry.

9. The method of Embodiment 8, further comprising:
identifying a substring of said first random number sequence, wherein said substring has a length sufficient to allow said substring to define said first table address; and
processing said substring to identify said first table address.

10. The method of Embodiment 8, further comprising:
determining that said first computing device has not previously communicated with said second computing device; and
retrieving said first entry in said first table comprising a pre-defined static table, based on said first table address.

11. The method of Embodiment 8, further comprising:
determining that said first computing device has previously communicated with said second computing device; and
retrieving said first entry in said first table comprising a dynamic table, based on said first table address.

12. The method of Embodiment 8, further comprising:
decoding said encoded entry by applying a decoding transformation function to said encoded entry and said first random number sequence, to determine said second transformed entry.

13. The method of Embodiment 8, further comprising:
retrieving a transformation substring from said first random number sequence;
identifying a plurality of transformation entries from said first table based on said transformation substring;
retrieving said plurality of transformation entries; and
executing said first transformation function on said plurality of transformation entries to generate said first transformed entry.

14. The method of Embodiment 8, further comprising:
retrieving said each entry of said first table;
defining a second transformation function using said first random number sequence;
transforming said each entry of said first table with said second transformation function to obtain said associated transformed entry; and
performing said update to said dynamic table by replacing said each entry of said dynamic table with said associated transformed entry.

15. A computing device configured for bidirectional device authentication, said computing device comprising a first processor and a first memory, said first memory configured to include a first table, said first computing device in communication with a second computing device having a second processor and a second memory, said second memory configured to include a second table, said first processor configured to:
generate a first random number sequence;
perform a first operation on said first random number sequence to determine a first table address;
retrieve a first entry in said first table based on said first table address;
execute a first transformation function on said first entry to generate a first transformed entry;
transmit said first random number sequence to said second computing device;
receive an encoded entry from said second computing device in response to transmission of said first random number sequence;
decode said encoded entry to determine a second transformed entry; and
upon verifying that said first transformed entry matches said second transformed entry, perform an update to a dynamic table by replacing each entry of said dynamic table with an associated transformed entry.

16. The computing device of Embodiment 15, wherein said first processor is further configured to:
identify a substring of said first random number sequence, wherein said substring has a length sufficient to allow said substring to define said first table address; and
process said substring to identify said first table address.

17. The computing device of Embodiment 15, wherein said first processor is further configured to:
determine that said first computing device has not previously communicated with said second computing device; and
retrieve said first entry in said first table comprising a pre-defined static table, based on said first table address.

18. The computing device of Embodiment 15, wherein said first processor is further configured to:

determine that said computing device has previously communicated with said second computing device; and retrieve said first entry in said first table comprising a dynamic table, based on said first table address.

19. The computing device of Embodiment 15, wherein said first processor is further configured to:

decode said encoded entry by applying a decoding transformation function to said encoded entry and said first random number sequence, to determine said second transformed entry.

20. The computing device of Embodiment 15, wherein said first processor is further configured to:

retrieve a transformation substring from said first random number sequence;

identify a plurality of transformation entries from said first table based on said transformation substring;

retrieve said plurality of transformation entries; and execute said first transformation function on said plurality of transformation entries to generate said first transformed entry.

21. The computing device of Embodiment 15, wherein said first processor is further configured to:

retrieve said each entry of said first table;

define a second transformation function using said first random number sequence;

transform said each entry of said first table with said second transformation function to obtain said associated transformed entry; and perform said update to said dynamic table by replacing said each entry of said dynamic table with said associated transformed entry.

LISTING OF REFERENCE NUMBERS

100 Configuration of a computing device
110 Computing device
111 User
120 Processor
130 Memory area
140 Input/output component
150 Communication interface
160 Other computing device
200 Communication system
210 Computing device
212 Processor
214 Memory
215 Pre-defined static table
216 Dynamic table
218 Communication interface
220 Computing device
222 Processor
224 Memory
225 Pre-defined static table
226 Dynamic table
228 Communication interface
230 Computing device
232 Processor
234 Memory
235 Pre-defined static table
236 Dynamic table
238 Communication interface
240 Transmission channel
242 Random number sequence packet
250 Transmission channel
252 Encoded packet
260 Transmission channel
262 Random number sequence packet
270 Transmission channel
272 Encoded packet
300 Flowchart
310 Generating step
320 Performing step
330 Retrieving step
340 Executing step
350 Transmitting step
360 Receiving step
370 Decoding step
380 Updating step
400 Flow diagram
410 Computing device
412 Processor
414 Memory
415 Pre-defined static table
416 Dynamic table
418 Communications interface
422 First random number sequence
424 First table address
430 First table
432 First entry
434 First transformed entry
440 Second computing device
442 Encoded entry
444 Second transformed entry
450 Authentication function
452 Authentication verification
500 Diagram
510 Computing device
511 Generating component
512 Operating component
513 Retrieving component
514 Executing component
515 Transmitting component
516 Receiving component
517 Decoding component
518 Updating component
520 Data store
521 Substring identifier data
522 First transformation function data
523 Decoding data
524 Connection history data
525 Table update function data

What is claimed:

1. A system for bidirectional device authentication configured to exchange random number sequences between a first computing device and a second computing device, and to use the random number sequences with tables and transformation functions to accomplish bidirectional device authentication, said system comprising:

a first computing device having a first processor and a first memory, said first memory configured to include a first table; and a second computing device having a second processor and a second memory, said second memory configured to include a second table, said second computing device in communication with said first computing device;

wherein said first processor is configured to:

generate a first random number sequence;

perform a first operation on said first random number sequence to determine a first table address;

retrieve a first entry in said first table based on said first table address;

execute a first transformation function on said first entry to generate a first transformed entry;

transmit said first random number sequence to said second computing device;

receive an encoded entry from said second computing device in response to transmission of said first random number sequence;

decode said encoded entry to determine a second transformed entry; and upon verifying that said first transformed entry matches said second transformed entry, perform an update to a dynamic table by replacing each entry of said dynamic table with an associated transformed entry.

2. The system according to claim 1, wherein said first processor is further configured to:

identify a substring of said first random number sequence, wherein said substring has a length sufficient to allow said substring to define said first table address; and process said substring to identify said first table address.

3. The system according to claim 1, wherein said first processor is further configured to:

determine that said first computing device has not previously communicated with said second computing device; and retrieve said first entry in said first table comprising a pre-defined static table, based on said first table address.

4. The system according to claim 1, wherein said first processor is further configured to:

determine that said first computing device has previously communicated with said second computing device; and retrieve said first entry in said first table comprising a dynamic table, based on said first table address.

5. The system according to claim 1, wherein said first processor is further configured to:

decode said encoded entry by applying a decoding transformation function to said encoded entry and said first random number sequence, to determine said second transformed entry.

6. The system according to claim 1, wherein said first processor is further configured to:

retrieve a transformation substring from said first random number sequence;

identify a plurality of transformation entries from said first table based on said transformation substring;

retrieve said plurality of transformation entries; and execute said first transformation function on said plurality of transformation entries to generate said first transformed entry.

7. The system according to claim 1, wherein said first processor is further configured to:

retrieve said each entry of said first table;

define a second transformation function using said first random number sequence;

transform said each entry of said first table with said second transformation function to obtain said associated transformed entry; and perform said update to said dynamic table by replacing said each entry of said dynamic table with said associated transformed entry.

8. A method for bidirectional device authentication implemented by a first processor included within a first computing device, said first computing device comprising said first processor and a first memory, said first memory configured to include a first table, said first computing device in communication with a second computing device having a second processor and a second memory, said second memory configured to include a second table, said method comprising:

generating a first random number sequence;

performing a first operation on said first random number sequence to determine a first table address;

retrieving a first entry in said first table based on said first table address;

executing a first transformation function on said first entry to generate a first transformed entry;

transmitting said first random number sequence to said second computing device;

receiving an encoded entry from said second computing device in response to transmission of said first random number sequence;

decoding said encoded entry to determine a second transformed entry; and upon verifying that said first transformed entry matches said second transformed entry, performing an update to a dynamic table by replacing each entry of said dynamic table with an associated transformed entry.

9. The method of claim 8, further comprising:

identifying a substring of said first random number sequence, wherein said substring has a length sufficient to allow said substring to define said first table address; and processing said substring to identify said first table address.

10. The method of claim 8, further comprising:

determining that said first computing device has not previously communicated with said second computing device; and retrieving said first entry in said first table comprising a pre-defined static table, based on said first table address.

11. The method of claim 8, further comprising:

determining that said first computing device has previously communicated with said second computing device; and retrieving said first entry in said first table comprising a dynamic table, based on said first table address.

12. The method of claim 8, further comprising:

decoding said encoded entry by applying a decoding transformation function to said encoded entry and said first random number sequence, to determine said second transformed entry.

13. The method of claim 8, further comprising:

retrieving a transformation substring from said first random number sequence;

identifying a plurality of transformation entries from said first table based on said transformation substring;

retrieving said plurality of transformation entries; and executing said first transformation function on said plurality of transformation entries to generate said first transformed entry.

14. The method of claim 8, further comprising:

retrieving said each entry of said first table;

defining a second transformation function using said first random number sequence;

transforming said each entry of said first table with said second transformation function to obtain said associated transformed entry; and performing said update to said dynamic table by replacing said each entry of said dynamic table with said associated transformed entry.

15. A computing device configured for bidirectional device authentication, said computing device comprising a first processor and a first memory, said first memory configured to include a first table, said first computing device in communication with a second computing device having a second processor and a second memory, said second memory configured to include a second table, said first processor configured to:
- generate a first random number sequence;
- perform a first operation on said first random number sequence to determine a first table address;
- retrieve a first entry in said first table based on said first table address;
- execute a first transformation function on said first entry to generate a first transformed entry;
- transmit said first random number sequence to said second computing device;
- receive an encoded entry from said second computing device in response to transmission of said first random number sequence;
- decode said encoded entry to determine a second transformed entry; and
- upon verifying that said first transformed entry matches said second transformed entry, perform an update to a dynamic table by replacing each entry of said dynamic table with an associated transformed entry.

16. The computing device of claim 15, wherein said first processor is further configured to:
- identify a substring of said first random number sequence, wherein said substring has a length sufficient to allow said substring to define said first table address; and
- process said substring to identify said first table address.

17. The computing device of claim 15, wherein said first processor is further configured to:
- determine that said computing device has not previously communicated with said second computing device; and
- retrieve said first entry in said first table comprising a pre-defined static table, based on said first table address.

18. The computing device of claim 15, wherein said first processor is further configured to:
- determine that said computing device has previously communicated with said second computing device; and
- retrieve said first entry in said first table comprising a dynamic table, based on said first table address.

19. The computing device of claim 15, wherein said first processor is further configured to:
- decode said encoded entry by applying a decoding transformation function to said encoded entry and said first random number sequence, to determine said second transformed entry.

20. The computing device of claim 15, wherein said first processor is further configured to:
- retrieve a transformation substring from said first random number sequence;
- identify a plurality of transformation entries from said first table based on said transformation substring;
- retrieve said plurality of transformation entries; and
- execute said first transformation function on said plurality of transformation entries to generate said first transformed entry.

* * * * *